United States Patent [19]
Hollis

[11] 4,179,801
[45] Dec. 25, 1979

[54] METHOD OF MAKING A MINIATURE FIBER OPTIC CONNECTOR

[75] Inventor: Ernest E. Hollis, Bedford, Mass.

[73] Assignee: Sanders Associates, Inc., Nashua, N.H.

[21] Appl. No.: 773,453

[22] Filed: Mar. 2, 1977

[51] Int. Cl.² ............................................. H01R 43/00
[52] U.S. Cl. .................... 29/626; 29/569 L; 29/591; 29/628; 350/96.20
[58] Field of Search ............. 29/626, 628, 569 L, 29/572, 590, 591; 350/96 C; 339/31 R, 31 M

[56] References Cited

U.S. PATENT DOCUMENTS

| | | | |
|---|---|---|---|
| 3,582,637 | 6/1971 | Cecil, Jr. ...................... | 350/96 C X |
| 3,790,791 | 2/1974 | Anderson ...................... | 350/96 C X |
| 3,803,409 | 4/1974 | Prochazka .................... | 350/96 C X |
| 3,878,397 | 4/1975 | Robb et al. ................... | 350/96 C X |
| 3,950,075 | 4/1976 | Cook et al. ................... | 350/96 C |

Primary Examiner—Carl E. Hall
Attorney, Agent, or Firm—Louis Etlinger; Robert K. Tendler

[57] ABSTRACT

A method of adapting a miniature standard coaxial connector to enable the coupling of a fiber optic cable to an active device is disclosed in which the female portion of the connector is partially disassembled by removing its central contact and modified by drilling out or otherwise enlarging the passage which is left after the removal of the contact. The active device is mounted through a hole drilled in a printed circuit board, and electrically coupled to the top layer thereof. This unit is then affixed to the end of the female connector carrying the enlarged passage, such that the metalized layer on the printed circuit board makes electrical contact with the metal casing of the female portion of the connector, and such that the face of the active element is exposed through the enlarged passage.

8 Claims, 7 Drawing Figures

FIG. 2C. DRILL P.C. BOARD

FIG. 2D. PUNCH OUT DONUT

FIG. 2E. INSERT ACTIVE ELEMENT AND SOLDER TABS TO METALLIZED LAYER.

MOUNT LUG AND ACTIVE ELEMENT.

METHOD OF MAKING A MINIATURE FIBER OPTIC CONNECTOR

FIELD OF THE INVENTION

This invention relates to fiber optic connectors and, more particularly, to a method and apparatus for modifying a standard miniature coaxial connector so as to accommodate the mounting of an active element, either a light emitting device or a light detecting device, at the female portion of the connector.

BACKGROUND OF THE INVENTION

With the availability and acceptance of fiber optic cables, comes the necessity of coupling light into and extracting light from the fiber optic cable. This entails the coupling of light, usually from a light emitting diode (LED), into the end of the fiber optic cable and the coupling of light from the end of the fiber optic cable to a photo-diode or other light detecting device. While fiber optic connectors which serve to position the fiber optic cable adjacent to such an active device have been known and utilized in the past, these devices have been relatively bulky devices. There is therefore a need for inexpensive miniature connectors to hold and position small diameter active elements, e.g. elements having diameters less than 100 mils. Prior art connectors include those illustrated in U.S. Pat. Nos. 3,878,397 issued to Robb et al, Apr. 15, 1975; 3,582,637, issued to John Cecil on June 1, 1971; 3,803,409, issued to Rudolf J. Prochauzka on Apr. 9, 1974; and 3,790,791, issued to Norman Anderson on Feb. 5, 1974. While the last of these two patents involve the modification of a standard connector, the modifications described in these patents require access to the interior of the connector which is to be modified. It will be appreciated that with subminiature light emitting diodes and photodetectors, it takes considerable time and effort to mount the active device within the housing of the connector. The difficulty stems from the limited clearance and limited access to the interior of the connector, as well as the small size of the devices to be mounted. Thus, in some cases the modification necessitates the use of tweezers which is, of course, an extremely time consuming process.

It will be appreciated that the length of time necessary to modify a connector materially affects the cost of the connector, and thus, if large amounts of time are expended in the modification, the modification becomes economically unfeasible.

Rather than mounting the active device within the modified connector housing, in the subject invention the active device is mounted at the end of the connector. This is accomplished by mounting the active device on a printed circuit (PC) board which has a metalized layer surrounding the active element. The printed circuit board is first drilled to provide a bore of the appropriate size and the active element inserted in the bore, with contact tabs at the face of the active element being soldered to the adjacent metalized layer. The PC board carrying the active device is then either silver epoxied or press-fitted onto the end of the female portion of a standard coaxial connector, with electrical contact being made from the tabs, through the metalizing layer to the metal casing of the female portion of the connector. The fiber optic bundle is inserted through the male pin of the male portion of the coaxial connector, such that when the two connector portions are mated, the end of the fiber optic bundle is aligned with and adjacent to the face of the active element.

Electrical connection to the active element is made via a lug which is carried by the casing of the female portion of the connector, and via an insulated wire or other conducting device, soldered to the contact at the back end of the active device.

For the modification, all that is necessary, therefore, is to remove the central pin or electrical contact from the female portion of the connector, enlarge the hole through which the pin originally protruded, drill a hole in a printed circuit board, punch out a donut shaped portion of the printed circuit board, with the bore concentrically carried, and either epoxy or press-fit the donut carrying the active device onto the end of the female connector. For applications in which many of the connectors are to be used together or "ganged", it is not necessary to punch out individual donuts. Rather, one PC board containing many active elements can be press-fitted to the backs of an equal number of connectors provided alignments can be precisely maintained. Generally, however, it is faster to use individually modified connectors ganged together. This avoids the problems associated with cumulative tolerances and also enables individual units to be more easily replaced in the event of failure of the active element.

In a hand operation, the entire modification takes place in under two minutes, though this time can be considerably improved upon with automated equipment.

A suitable miniature coaxial connector that is manufactured by many vendors is designated type SMC. This very inexpensive connector meets MIL SPEC MIL 39012/SMC. Typical manufacturers of this part are Automatic Connector, Americon/Omnispectra, and Sealectro. This connector is also called a TMM connector by some manufacturers. The barrel diameter of this connector is about 146 mils and the protrusion length is about 274 mils. The finished connector is thus about one seventh the cross section and one third the length of other fiber optic connectors. Because one of the big advantages of fiber optic cables is small size, with a connector of this size, it would be extremely difficult to make insertions into the connector body, which insertions would not only be time consuming and costly, but also might result in misalignment of the active element with the end of the fiber optic bundle.

It is therefore an object of this invention to provide a method for adapting a standard miniature coaxial connector for the coupling of fiber optic bundles or elements to an active element, either of the light emitting or light detecting variety.

It is another object of this invention to provide apparatus for quickly modifying a standard coaxial connector so that it may be utilized with fiber optic cables and active elements.

It is yet another object of this invention to provide an end-mounted active element configuration for the female portion of a connector in which the active element is to be optically coupled to fiber optic element or bundle; and, It is a yet still further object of this invention to provide an economical fiber optic connector as a modification of a standard coaxial connector.

These and other objects will be better understood in connection with the following description taken in conjunction with the following drawings in which:

DETAILED DESCRIPTION

Figure 1:
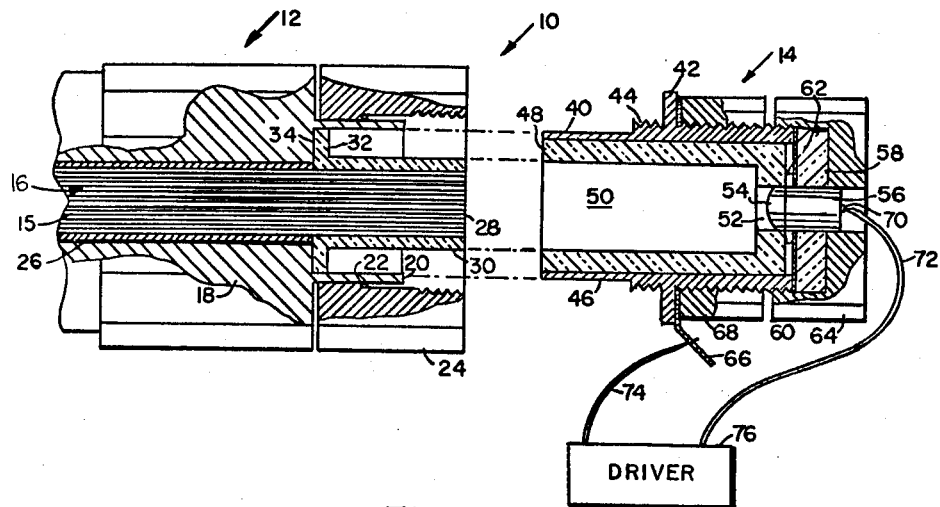
FIG. 1 is a cross sectional and diagrammatic illustration of the subject fiber optic connector, illustrating the end-mounting of the active device; and, FIGS. 2A through 2F are diagrammatic illustrations of the method by which the female portion of a standard coaxial connector is modified so as to mount the active device thereon.

Referring to FIG. 1, a metal-bodied connector 10 modified in accordance with the teachings of the subject invention, includes a male portion 12 and a female portion 14. Male portion 12 carries a central bore 15 through which a fiber optic cable 16 is passed. The male portion of the connector includes a stationary body 18 having an annular coaxial sleeve 20 which extends to the right as shown. Sleeve 20 carries a retaining ring or like device 22. A nut 24 is mounted for coaxial rotation about sleeve 20 and is retained in position by ring 22. The fiber optic cable includes an outer sleeve 26 which is striped back from the end of the fiber optic bundle or element 28 so that the fiber optic bundle or element may pass through the central bore of a retaining member 30 which has a flange 32 at the lefthand end. Flange 32 rests against a stop 34 which is integral to the body of the male portion of the connector when the retaining member is in place. The single piece pin sleeve is removed from the male connector by simply shaking. The fiber optic cable is passed into the hole in the teflon thus created. Except for these two simple operations, the male connector is unaltered. It will be appreciated that smaller diameter cables can be accommodated by simple sleeving arrangements. In one embodiment, the connector is the male portion of the standard RG188 co-ax connector available as Automatic Connector Model GG4601-000-819.

The female portion of the standard connector includes a metallic body 40 which has an annular flange 42 positioned centrally between its ends. The body of the female portion 14 of the connector to the right of flange 42 is threaded, as is a small portion 44 to the left of the flange. An unthreaded portion 46 is of decreased diameter and extends to the left. This portion is adapted to fit within the space between sleeve 20 and retaining member 30 of the male portion of the connector when the two halves of the connector mate. This helps provide excellent angular and transverse alignment. Nut 24 is threaded such that when the two halves of the connector are mated, nut 24 draws the male portion towards the female portion.

The female portion of the connector carries an inner sleeve 48 having a central bore 50 and a counter bore 52 which is enlarged to accommodate the exposure or protrusion therethrough of the face 54 of an active element 56 which may either be a light emitting or light detecting device. The term "light emitting or detecting" devices refers both to devices which operate in the visible region of the electromagnetic spectrum and to those which operate in the infrared (IR) region.

It will be appreciated that cables can be positioned against the face 54 of active element 56 if desired by simple combinations of sleeving and/or enlarging bore 52 depending on the elements used.

In general, the light emitting device may be a light emitting diode as mentioned hereinbefore, which is of exceptionally small size, typically having a diameter of 0.060 inch. Alternatively, this device may be a photodetector, likewise of small size. In either case, the active element is usually provided with an integrally formed lens at the face of the active element and it is this lens which protrudes into counter bore 52. Active elements include commercial IRED's, such as TI TIL23 and TIL24 and Optron OP123 and OP124 and photodetectors such as HP4205 and Optron series OP300 to 305, Optron OP600 to 644, and OP900.

Active element 56 is mounted through a printed circuit board 58, which carries at least one metalized layer 60 to which tabs 62 of the active element are electrically attached. The printed circuit board with the active element therethrough, is mounted as a unit at the end of body 40 such that metalized layer 60 makes electrical contact with the metal body. A retaining nut 64 clamps the printed circuit board/active element unit to the back of the female portion of the connector such that the active element is centrally located and in line with the fiber optic bundle to be inserted into central bore 50 during mating. Alternatively, the retaining nut need not be utilized, and the printed circuit board may be silver epoxied to the back of the female portion of the connector. This adhesively and electrically attaches the active element to the female portion of the connector. As will be appreciated, the adhesive attachment may also be accomplished by soldering the printed circuit board to the back of the connector or by utilizing any of a variety of conductive adhesives.

Electrical connection to the active element may be accomplished via the connection from tabs 62 via layer 60 and metallic body 40 to a lug 66 carried coaxially about the outside of the female portion of the connector and clamped into place via nut 68. The other connection to the active element is via the conventional centrally located contact 70 to which an insulated wire 72 may be attached. In the case of a light emitting device, power may be applied via conductor 72 and conductor 74 from a conventional driver 76 which is taken to include any type device for modulating the output from the active element. Alternatively, the leads from the connector may be coupled to a detection circuit (not shown) for detecting modulation of the light coupled from the fiber optic cable to the active element.

As will be readily apparent, the unit comprising the printed circuit board and active element is easily attached to the female portion of the connector, as access to the connector interior is not necessary. Rather, the active element is merely attached to the back of the female portion of the connector. Thus, this mounting system is particularly convenient with active elements of extremely small subminiature size. It will be appreciated that the handling of the printed circuit board, being of larger size than the active element, is considerably easier than the handling of the active element itself. Moreover, quick alignment is achieved via the enlarged counterbore, since the counterbore is enlarged to exactly fit that portion of the active element which protrudes above the tabs. Not only is the alignment of the active device relative to the female connector easily achieved, but also its alignment with respect to the end of the fiber optic cable is also quickly achieved due to the coaxial arrangement.

What has therefore been provided, is a modified coaxial connector in which the modification involves operations which can take place at one end of the female portion of the connector and which do not require access to the interior of the female portion of the connector.

Figure 2A:
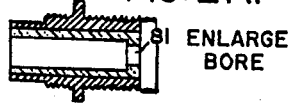
Figure 2B:
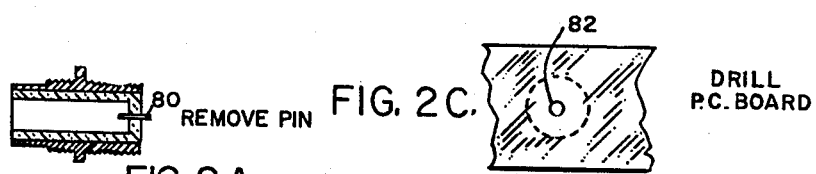

In the case of the above mentioned standard connector, and more particularly, referring to FIGS. 2A through 2F, a modification technique is described which can be accomplished in under two minutes without the aid of automatic equipment. As can be seen from these figures, the modification is to the female portion of the connector. Referring to FIG. 2A, the first step in the modification is to remove the central pin 80 from the connector. Secondly, as seen in FIG. 2B, the bore left by the removal of the pin is enlarged by drilling or by using a hot wire, then trimming with an Exacto knife. In the case of Automatic Connector Model 4632, the bore size is increased to 0.0625 inch so as to accommodate any of the active elements listed above.

Figure 2F:
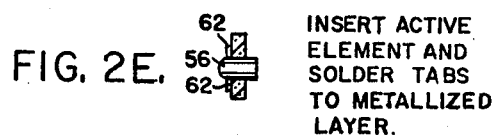
Figure 2F:
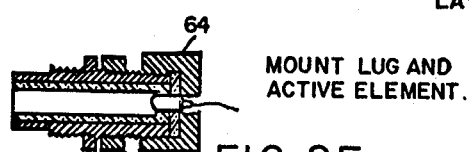

Referring to FIG. 2C, a printed circuit board is provided with a continuous metalized layer and is drilled so as to provide a bore of 0.0625 inch. Thereafter, a donut shaped portion (FIG. 2D) of the board 84 is punched out of the printed circuit board concentric to the bore previously provided This operation may be accomplished within seconds by use of a common inexpensive hand punch such as a Whitney Jensen punch #5 jr. As seen in FIG. 2E, the active device is inserted through bore 82 and its tabs are soldered to the metalized layer. Thereafter, as shown in FIG. 2F, after the mounting of the lug, the unit provided in FIG. 2E is mounted at the end of the female portion of the connector and is clamped in place via nut 64.

The time allotted for such modification may be broken down as follows: Removal of pin 80=15 seconds; enlargement of bore 81=15 seconds; drilling of PC board=5 seconds; punching out donut=15 seconds; insertion of active element=15 seconds; soldering of tabs to metalized layer=10 seconds; and mounting of lug and PC board/active element unit=30 seconds. These are conservative estimates for the amount of time necessary to modify the female portion of the connector and improvement can be obtained via automatic equipment if desired. Test fixtures and jigs would also reduce these times on an assembly line basis.

Alternatively, the PC board donut may be adhesively attached to the back of the female portion of the connector via silver epoxy in approximately 30 seconds with a cure at 125° for 20 to 30 minutes. In large batches, the operator time per unit is established at approximately 3 seconds for this operation.

As can be seen, the modification is quickly and easily accomplished with a minimum of tools and automatic processing equipment such that an extremely low cost connector is fabricated. In an alternative embodiment, the tabs need not be soldered to the metalized layer on the PC board, but rather may be maintained in contact by a press-fit through bore 82. It should be noted that the press-fit will be maintained by virtue of the clamping of the PC board to the back end of the female portion of the connector in view of the sandwich structure between member 48, the tabs, and the metalized layer.

As will also be appreciated, the fiber optic cable is merely inserted into the male portion of the connector and held in place by standard retaining methods. Crimping or adhesives can also be used if desired.

This describes one type modification. However, it will be appreciated that the printed circuit board could be any type support, metalized or not. Moreover, the metal layer could be any type of electrically conducting layer and the support can be pre-sized so as to eliminate the punching step.

What has heretofore been provided is an extremely small inexpensive high performance subminiature connector capable of accommodating active elements whose size is much more compatible with fiber optic cables. The weight of this connector is negligible and the connector can therefore be utilized in a wide variety of applications where space and weight are at a premium. Although the modification technique is dscribed in connection with a specific type of standard coaxial connector, it will be appreciated that the subject technique is adaptable to a wide variety of standard connectors where it is desirable to mount active elements without obtaining access to the interior of the connector.

Although a specific embodiment to the invention has been described in considerable detail for illustrative purposes, many modifications will occur to those skilled in the art. It is therefore desired that the protection afforded by Letters Patent be limited only by the true scope of the appended claims.

What is claimed is:

1. A method of modifying the female portion of a standard metal-bodied coaxial connector to accommodate an active electro-optical element adapted to be aligned with and coupled to a fiber optic element carried by the male portion of the connector, comprising the steps of:
   removing the central electrical contact;
   enlarging the hole left after removal;
   providing a printed circuit board with a metalized layer on one surface thereof;
   boring a hole through the printed circuit board of a size to accomodate the active electro-optical element;
   punching out a portion of the printed circuit board surrounding the hole bored therethrough;
   mounting an active element having laterally extending electrical contact tabs through the hole in the punched-out portion of the printed circuit board such that the tabs make electrical contact with the metalized layer; and,
   mounting the printed circuit board at the end of the female connector such that said element is adjacent the enlarged hole and such that electrical contact is made between the metalized layer on the printed circuit board and the housing of the female portion of the coaxial connector, whereby the modification does not require the mounting of the device inside the female portion 20 of the connector.

2. The method of claim 1 wherein mounting the printed circuit board includes the step of using electrically conductive adhesive.

3. The method of claim 1 wherein mounting the printed circuit board includes the step of mechanically clamping said board to said housing.

4. The method of claim 3 wherein said clamping step includes the step of providing said housing with exterior screw threads and providing an apertured and interiorly threaded cap screwed on over the printed circuit board to sandwich the board between the cap and the housing.

5. The method of claim 1 and further including the step of providing said housing with electrical connection means prior to mounting the printed circuit board.

6. A method of modifying the female portion of a standard coaxial connector to accommodate an active electro-optical element adapted to be aligned with and coupled to a fiber optic element carried by the male portion of the connector, comprising the steps of:
  removing the central electrical contact;
  enlarging the hole left after removal;
  providing a support;
  boring a hole through the support of a size to accommodate a portion of an active electro-optical element;
  mounting said active element through the hole in the support such that a portion thereof projects away from said support; and,
  mounting the support at the end of the female connector portion such that a portion of said element projects into the enlarged hole.

7. A method of modifying the female portion of a standard metal-bodied coaxial connector to accommodate an active electro-optical element adapted to be aligned with and coupled to a fiber optic element carried by the male portion of the connector, comprising the steps of:
  removing the central electrical contact;
  enlarging the hole left after removal;
  providing a support with an electrically conducting layer on one surface thereof;
  boring a hole through the support of a size to accommodate a portion of an active electro-optical element;
  mounting an active element having laterally extending electrical contact tabs through the hole in the support such that the tabs make electrical contact with the electrically conducting layer and such that a portion of said element projects away from said support; and,
  mounting the support at the end of the female connector portion such that said element projects into the enlarged hole and such that electrical contact is made between the electrically conducting layer and the housing of the female portion of the coaxial connector.

8. The method of claim 7 and further including the step of removing a portion of the support surrounding the hole bored therethrough.

* * * * *